June 5, 1923.  1,457,676
F. G. STANTIAL
PROCESS OF MAKING SULPHURIC ACID AND APPARATUS THEREFOR
Filed May 27, 1922
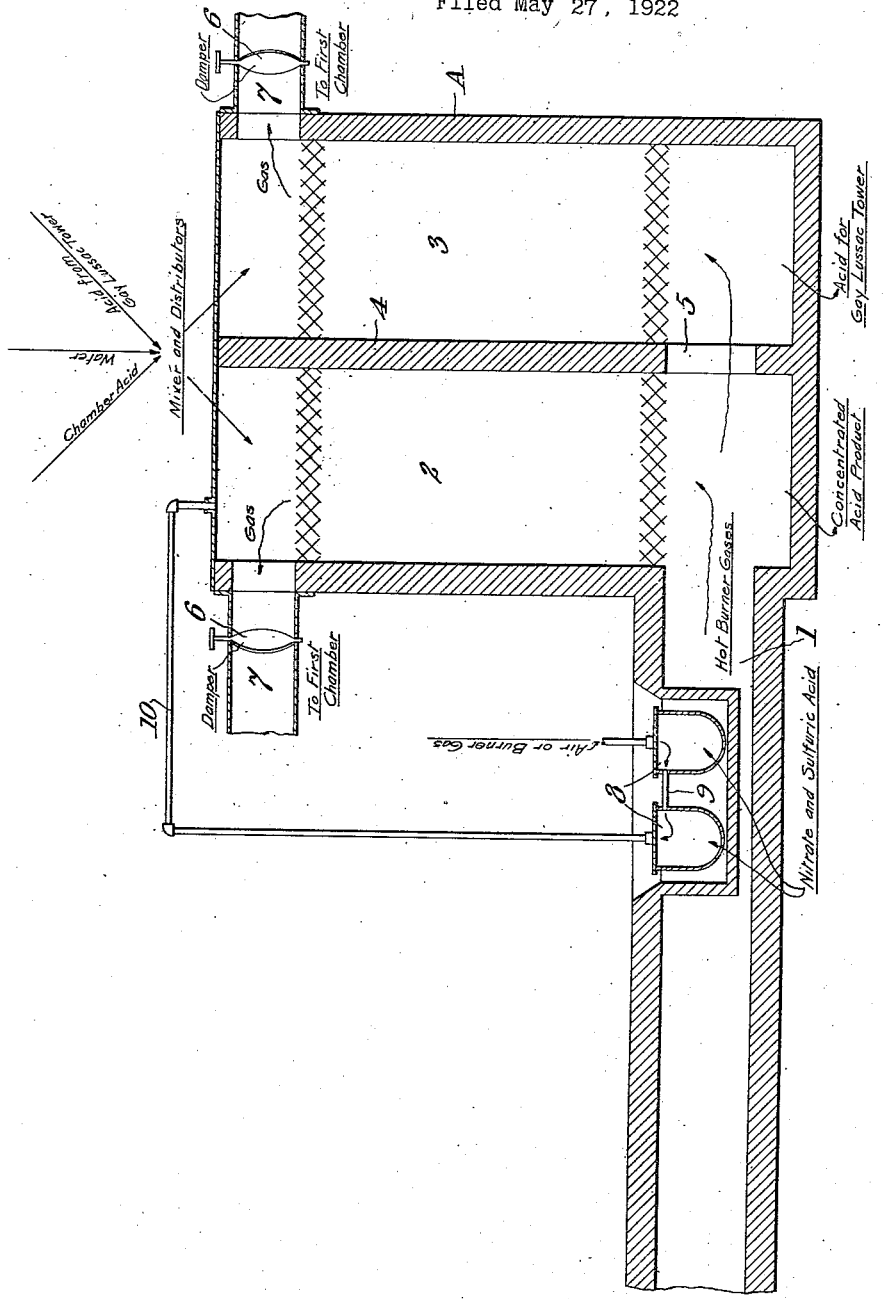
Inventor:
Frank G. Stantial,
by Byrnes, Townsend & Brickenstein,
Attorneys.

Patented June 5, 1923.

1,457,676

UNITED STATES PATENT OFFICE.

FRANK G. STANTIAL, OF MELROSE, MASSACHUSETTS, ASSIGNOR TO MERRIMAC CHEMICAL COMPANY, OF WOBURN, MASSACHUSETTS, A CORPORATION OF MASSACHUSETTS.

PROCESS OF MAKING SULPHURIC ACID AND APPARATUS THEREFOR.

Application filed May 27, 1922. Serial No. 564,160.

*To all whom it may concern:*

Be it known that I, FRANK G. STANTIAL, a citizen of the United States, residing at 146 Florence Street, Melrose, in the county of Middlesex and State of Massachusetts, have invented certain new and useful Improvements in Processes of Making Sulphuric Acid and Apparatus Therefor, of which the following is a specification.

This invention relates to an improved process of an apparatus for making sulphuric acid in which an acid product of relatively high concentration is produced.

In the operation of a chamber system for the manufacture of sulphuric acid it is customary to circulate acid through the Gay Lussac and Glover towers, the acid absorbing nitrogen oxide gases in the Gay Lussac tower and being denitrated and concentrated for reuse in the Gay Lussac tower by passing in contact with the hot burner gases in the Glover tower. It is also customary to feed chamber acid with the acid from the Gay Lussac tower to the Glover tower whereby it is denitrated and concentrated. As a result of this operation there is produced in the Glover tower niter free acid of about 58° to 60° Bé. in quantity more than is required to supply the Gay Lussac tower. The excess of acid which corresponds in quantity with the chamber acid or "make" is withdrawn from the system but usually requires further concentration up to say 66° Bé. This concentration may be carried out in separate apparatus but since the heat of the burner gases is more than sufficient for the operation of the Glover tower it is desirable and various attempts have been made to utilize this heat for the further concentration of the part of the acid to be withdrawn from the system. A suggested method is to utilize the excess of heat by concentrating the acid in the Glover tower to the maximum extent and then diluting a portion of the concentrated acid for supplying the Gay Lussac tower. This method however introduces an excess of water into the system besides being wasteful of heat.

According to my invention the Gay Lussac tower acid and chamber acid are mixed together and the mixture is divided between two Glover towers or preferably between two shafts of the same Glover tower, the acid in one shaft being denitrated and concentrated to the desired extent for use in the Gay Lussac tower while the acid in the other shaft is denitrated and concentrated to the maximum extent for withdrawal from the system.

The denitration and concentration of acid in the Glover tower is accomplished by supplying the two shafts with acid and burner gases both in parallel, the desired degree of concentration in the two shafts being produced by regulating the division of the acid and of the burner gases between the two shafts. Thus, the quantity of acid necessary to supply the Gay Lussac tower is fed into one shaft of the Glover tower which is supplied with sufficient burner gases to denitrate it and concentrate it to the proper extent. The remainder of the mixture of acids and the remainder of the burner gases are supplied to the other shaft of the Glover tower.

Apparatus suitable for carrying out my process is illustrated in the accompanying drawings in which the figure is a vertical section of the Glover tower.

Referring to the drawing, 1 is the conduit which conveys burner gases from the sulfur or ore burner and delivers them into the bottom of the Glover tower A. The tower A is divided into two vertical shafts 2 and 3 by a wall 4. Each shaft contains a suitable filling material. Below the filling material the two shafts are in communication through the opening 5. The top of each shaft is provided with an outlet pipe 7, controlled by dampers 6, leading to the first of the lead chambers. The apparatus for mixing and distributing Gay Lussac tower acid and chamber acid to the two shafts of the Glover tower and for withdrawing acid from the bottom of each shaft are not illustrated but are merely indicated by arrows and suitable legends. As indicated chamber acid and acid from the Gay Lussac tower and water if necessary are fed into a mixer and distributors from which a portion of the mixture is delivered to each shaft. Acid for the Gay Lussac tower and the concentrated acid product to be withdrawn from the system are separately removed from the bottoms of the two shafts as indicated.

The system is supplied with niter from the niter pots 8, 8 set in a depression in the conduit 1. The niter pots are connected in series by the pipe 9 and are supplied with nitrate and sulfuric acid and air or burner gases as indicated by the arrows and legends. The nitric acid and nitrogen oxid containing gases pass through the pipe 10 and are delivered into the stream of gases leaving the Glover tower, thus by-passing the Glover tower.

An example of the process as it may be carried out in the above described apparatus is as follows:

It is assumed that the quantity of acid required to be fed to the Gay Lussac tower is about double the "make" of the set of chambers and that the chamber acid is about 53° Bé. and the acid from the Gay Lussac tower is about 58–60° Bé. and that it is desired to feed the Gay Lussac tower with acid of about 58°–60° Bé. The chamber acid and Gay Lussac tower acid are mixed together and about two-thirds of the mixture is fed to shaft 3 while one-third of the mixture is fed to shaft 2. The flow of burner gases is divided between the two shafts by means of the dampers 6. In this particular instance it is found that about half of the burner gases are required in shaft 3 and the other half may be supplied to shaft 2. Since the amount of acid flowing in shaft 2 is less than that flowing in shaft 3, the concentration in shaft 2 will be considerably higher than in shaft 3 being in the neighborhood of from 63° to 66° Bé. The distribution of the gases between the two shafts is regulated at all times to secure the desired concentration of acid in shaft 3 for supplying the Gay Lussac tower the excess of the gases being used for concentration in shaft 2. The relative amounts of acid fed to the two shafts is also regulated, sufficient acid being fed to shaft 3 to supply the Gay Lussac tower and the remainder being fed to shaft 2.

The burner gases entering the Glover tower ordinarily are at about 600 to 1000° C.

I have illustrated the two shafts 2 and 3 as being of equal size but the invention is not limited in this respect. Shafts of different size may be employed. The invention is not limited to the particular construction of Glover tower illustrated. Instead of a single Glover tower divided into two shafts, two separate structures may be employed and the two shafts may be supplied with burner gases through separate controlled gas conduits or a branched gas conduit leading from the sulfur or ore burner.

It is noted that the niter supply to the chambers by-passes the Glover tower and the burner gases are thus free from nitrogen oxids and the concentrated acid produced in the Glover tower is entirely free from oxids of nitrogen.

It is further noted that my process does not involve the introduction of hot and partially concentrated acid into the Glover tower or similar concentrating apparatus and the use of expensive apparatus and high repair costs, or loss of heat in case the hot concentrated acid is cooled, is avoided.

A further feature of my invention resides in that the gases leave the two shafts of the Glover tower at substantially the same temperature and equalization of the temperature of the gases leaving the two shafts before introducing it into the chambers is unnecessary. In order to secure this result I may resort to the use of different depths or sizes of packing in the two shafts.

I claim:

1. In the process of making sulphuric acid by the chamber process the steps comprising dividing the nitrous vitriol into separate portions, contacting one of said portions with burner gases in quantity sufficient to denitrate and concentrate the same to the desired degree, and contacting another of said portions of nitrous vitriol with burner gases in quantity sufficient to denitrate the same and concentrate the same to a degree different from the degree of concentration of said first-named portion.

2. In the process of making sulphuric acid by the chamber process the steps comprising contacting separate portions of the nitrous vitriol with separate portions of the burner gases, the ratio of the separate portions of nitrous vitriol to the separate portions of burner gases being unequal.

3. In the process of making sulphuric acid by the chamber process the steps comprising contacting a portion of nitrous vitriol sufficient when denitrated and concentrated to supply the Gay Lussac towers with a portion of the burner gases sufficient to denitrate the same and concentrate the same only to the degree required for use in the Gay Lussac tower, and contacting the remainder of the nitrous vitriol with the remainder of the burner gases.

4. In the process of making sulphuric acid by the chamber process the steps comprising dividing the flow of nitrous vitriol into parallel streams, dividing the flow of burner gases into parallel streams, contacting one of said streams of nitrous vitriol with one of said streams of burner gases and delivering the resulting denitrated acid to the Gay Lussac towers, and contacting another of said streams of nitrous vitriol with another of said streams of burner gases and withdrawing the resulting denitrated acid from the process.

5. In the process of making sulphuric acid by the chamber process the steps comprising, mixing acid from the Gay Lussac tower with chamber acid, supplying a portion of the mixture sufficient to supply the Gay Lussac tower to a denitrating and concentrating means and contacting the same with hot burner gases in quantity sufficient to denitrate and concentrate said portion of acid only to the desired degree for use in the Gay Lussac tower, supplying the remainder of the mixture of acids to another denitrating and concentrating means and contacting the same with the remainder of the burner gases.

6. In the process of making sulphuric acid by the chamber process the steps comprising circulating a stream of acid through a Glover tower and a Gay Lussac tower, adding chamber acid to said stream of acid flowing from the Gay Lussac tower to the Glover tower, dividing the combined stream of acids into at least two portions, denitrating and concentrating one of said portions of the combined stream of acids by contacting the same directly with a portion of the hot burner gases and returning said portion to the Gay Lussac tower, and denitrating and concentrating another portion of said combined stream of acids by contacting the same directly with another portion of the hot burner gases and withdrawing said last named portion from the system.

7. Apparatus for concentrating sulphuric acid comprising acid denitrating and concentrating towers, means for supplying said towers with acid directly from the same source, means for supplying said towers with hot gases directly from the same source, and means for varying the ratio of acid to hot gases supplied to said towers.

8. Apparatus for concentrating sulphuric acid comprising two denitrating and concentrating towers, means for supplying each of said towers with a mixture of acids from the Gay Lussac tower and from the chambers, means for supplying both of said towers with hot gases directly from the sulfur or ore burners, and means for varying the ratio of said acids and said hot gases supplied to said towers.

9. In chamber apparatus for the manufacture of sulphuric acid, a Glover tower having two parallel shafts, means for supplying each of said shafts with a mixture of acids from the Gay Lussac tower and from the chambers, means for supplying each of said shafts with hot burner gases, and means for delivering acid from only one of said shafts to a Gay Lussac tower and means for separately withdrawing acid from the other of said shafts.

10. Apparatus for making sulphuric acid comprising a Glover tower having a filling and a partition wall dividing the same into two shafts, means for supplying each of said shafts with acid, means for supplying each of said shafts with hot gases, means for delivering acid from only one of said shafts to a Gay Lussac tower and means for separately withdrawing acid from the other of said shafts.

11. Apparatus for making sulphuric acid comprising a Gay Lussac tower, a plurality of Glover towers, means for supplying each of said Glover towers with acid directly from the same source, means for supplying each of said Glover towers directly with hot burner gases, means for delivering acid from at least one but not all of said Glover towers to said Gay Lussac tower, and means for separately withdrawing acid from another of said Glover towers.

In testimony whereof, I affix my signature.

FRANK G. STANTIAL.